United States Patent
Roscher et al.

(10) Patent No.: US 6,458,325 B1
(45) Date of Patent: Oct. 1, 2002

(54) APPARATUS FOR ANALYZING LIQUID SAMPLES AUTOMATICALLY AND CONTINUALLY

(75) Inventors: Dietrich Roscher; Peter Heun; Holger Klingner, all of Erfurt; Norbert Gebert, Schwansee, all of (DE)

(73) Assignee: ABB Limited, Staffordshire (GB)

( * ) Notice: Subject to any disclaimer, the term of this patent is extended or adjusted under 35 U.S.C. 154(b) by 0 days.

(21) Appl. No.: 08/976,393

(22) Filed: Nov. 21, 1997

(30) Foreign Application Priority Data

Nov. 25, 1996 (DE) .......................................... 196 48 695

(51) Int. Cl.⁷ ............................................. G01N 33/00
(52) U.S. Cl. .......................... 422/68.1; 422/81; 422/99; 422/100; 422/103; 436/164; 436/165; 436/174; 436/179; 436/180
(58) Field of Search ........................ 422/68.1, 81, 100, 422/99, 103; 436/43, 52, 54, 164, 165, 174, 179, 180; 417/322, 410.1, 413.1, 413.2, 413.3

(56) References Cited

U.S. PATENT DOCUMENTS

| | | | | |
|---|---|---|---|---|
| 4,708,600 A | * | 11/1987 | AbuJudom, II et al. | 417/322 |
| 4,822,250 A | * | 4/1989 | Tsubouchi et al. | 417/45 |
| 4,908,112 A | | 3/1990 | Pace | |
| 5,085,562 A | | 2/1992 | van Lintel | |
| 5,171,132 A | * | 12/1992 | Miyazaki et al. | 417/413 |
| 5,224,843 A | * | 7/1993 | Van Lintel | 417/413 |
| 5,252,294 A | * | 10/1993 | Kroy et al. | 422/102 |
| 5,451,788 A | | 9/1995 | Pollack | 250/361.6 |
| 5,519,635 A | | 5/1996 | Miyake et al. | 364/497 |
| 5,525,041 A | * | 6/1996 | Deak | 417/63 |
| 5,611,676 A | * | 3/1997 | Ooumi et al. | 417/322 |
| 5,637,469 A | * | 6/1997 | Wilding et al. | 435/7.21 |
| 5,677,195 A | * | 10/1997 | Winkler et al. | 436/518 |
| 5,705,018 A | * | 1/1998 | Hartley | 156/345 |
| 5,816,780 A | * | 10/1998 | Bishop et al. | 417/322 |
| 5,840,062 A | * | 11/1998 | Gumaste et al. | 604/68 |
| 5,856,174 A | * | 1/1999 | Lipshutz et al. | 435/286.5 |
| 5,863,502 A | * | 1/1999 | Southgate et al. | 422/58 |
| 5,876,187 A | * | 3/1999 | Afromowitz et al. | 417/322 |
| 5,922,591 A | * | 7/1999 | Anderson et al. | 435/287.2 |
| 6,054,277 A | * | 4/2000 | Furcht et al. | 435/6 |

FOREIGN PATENT DOCUMENTS

| | | |
|---|---|---|
| EP | 0134614 | 3/1985 |
| EP | 0488947 | 6/1992 |
| EP | 0494531 | 7/1992 |
| EP | 0737483 | 10/1996 |
| WO | 93/22058 | 11/1993 |
| WO | 96/14934 | 5/1996 |

OTHER PUBLICATIONS

Gerlach and Warmus, Technical University Ilmenau, Design Considerations on the Dynamic Micropump, Actuator 96, 5th International Conference on New Actuators, Jun. 26–28, 1996, Bremen, Germany.

(List continued on next page.)

*Primary Examiner*—Jill Warden
*Assistant Examiner*—Dwayne K Handy
(74) *Attorney, Agent, or Firm*—Jordan and Hamburg LLP

(57) ABSTRACT

An apparatus analyzes liquid samples automatically and continuously by mixing certain reagents within a common arrangement of membrane pumps, mixing chambers and connecting conduits formed in a silicon wafer and evaluating the reaction results with the help of suitable sensors on the silicon wafer, the silicon wafer being of 100 orientation and the structure thereof having been formed by anisotropic etching. Immediately before and after the pump chamber of trapezoidal cross section, there are conduits of a v-shaped or trapezoidal cross section which have a nonlinear flow resistance.

12 Claims, 7 Drawing Sheets

OTHER PUBLICATIONS

Buestgens et al., Micromembrane Pump Manufactured by Molding, Actuator 96, 5th International Conference on New Actuators, Jun. 26–28, 1996, Bremen, Germany.

Temmel et al., A Micromechanical System for Liquid Dosage and Nebulization, Actuator 96, 5th International Conference on New Actuators, Jun. 26–28, 1996, Bremen, Germany.

Gerlach T. et al.: "a new micropump principle of the reciprocating type using pyramidic micro flow channels as passive valves" Journal of Micromechanics and Microengineering, June 1995, UK, Bd. 5, Nr. 2, 4, Januar 1995, ISSN 0960–1317, pp. 199–201.

Gerlach T. et al.,: "Working principle and performance of the dynamic micropump" Sensors and Acturators A, Bd. 50, Nr. 1, August 1995, pp. 135–140.

Schwesinger N. et al.,: "A modular microfluid system with an integrated micromixer" Sixth European workshop on Micromechanics (MME '95), Copenyhagen, denmark, 3–5 Spt. 1995, Bd. 6, Nr. 1, March 1996, ISSN 0960–1317, Journal of Micromechanics and Microengineering, March 1996, IOP Publishing, UK, pp. 99–102.

* cited by examiner

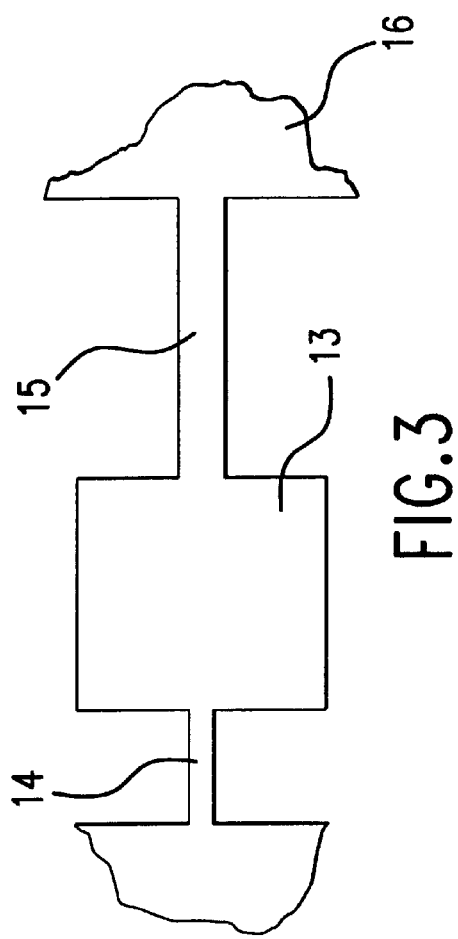
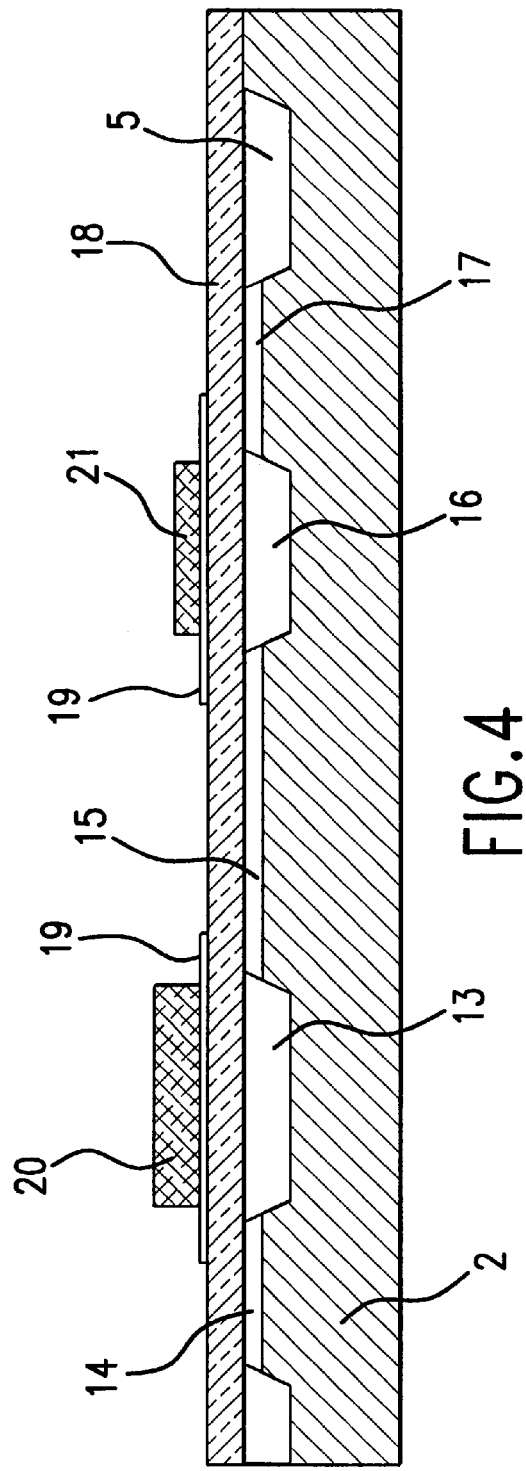

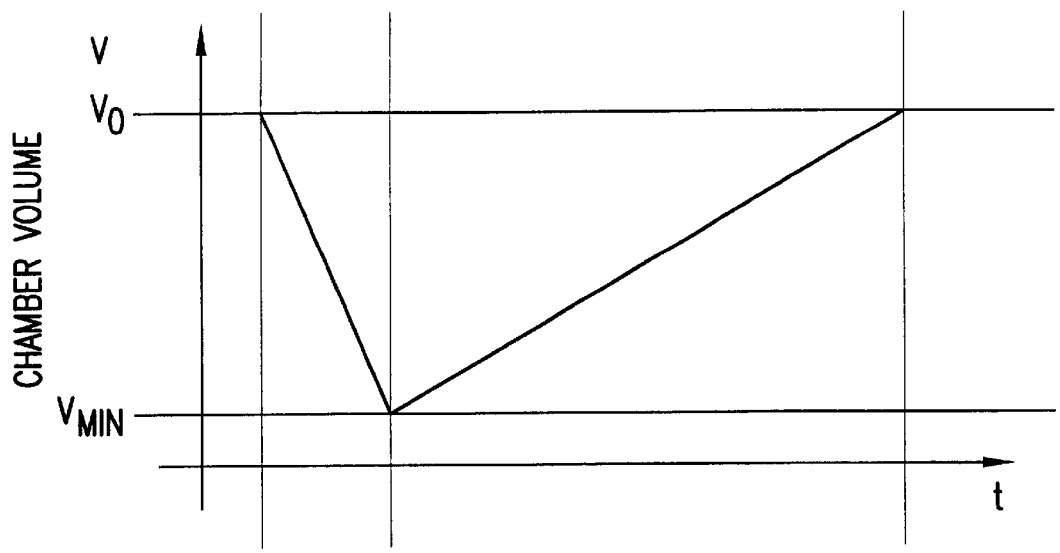
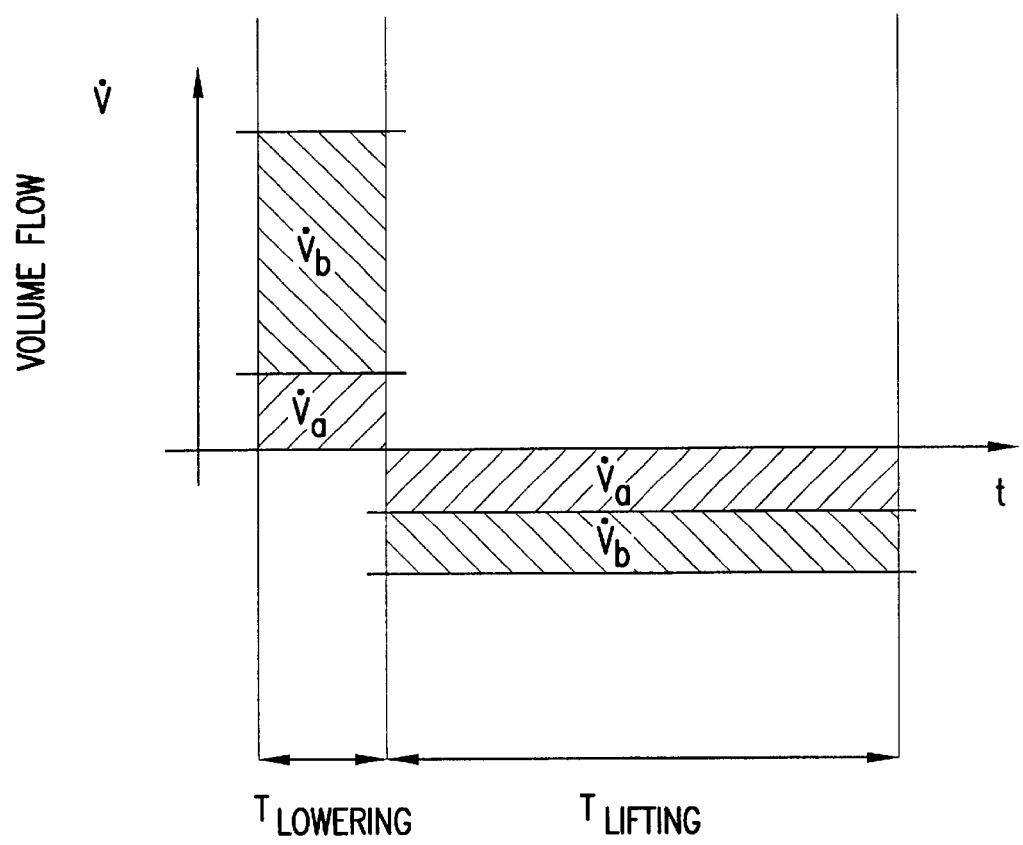
FIG.6

APPARATUS FOR ANALYZING LIQUID SAMPLES AUTOMATICALLY AND CONTINUALLY

BACKGROUND OF THE INVENTION

The invention relates to an apparatus for analyzing liquid samples automatically and continuously by mixing certain reagents with the use of membrane pumps, mixing chambers and conduits and evaluating the reaction results with the help of suitable sensors.

In the state of the art, apparatuses are known which use, for this task, different types of pumps, including also membrane pumps, which deliver a certain volume in a particular time and, with that, bring about the mixing ratio necessary for the chemical reaction.

Furthermore, pump arrangements are known which mix particularly small amounts of reagents. Manufacturing technologies are used for this purpose which can be considered to be in the field of micromechanics. The active element is a micropump, which is responsible for delivering the sample or a reagent necessary for the analysis. This micropump consists of a driving mechanism and a valve arrangement.

In Gerlach and Warmus, Technical University Ilmenau, Design Considerations on the Dynamic Micropump, ACTUATOR 96, 5th International Conference on New Actuators, Jun. 26–28, 1996, Bremen, Germany, a membrane in a silicon wafer, which is constructed as a piezo dimorphic system, is used as driving mechanism. The valves are direction-dependent, pyramidshaped flow resistances, which are disposed in a second silicon wafer. The use of two wafers, which must be positioned precisely and are connected to one another, is a disadvantage. Due to tolerances, the metering of precise amounts is not achieved.

A different construction, described in Buestgens et al., Micromembrane Pump Manufactured by Molding, ACTUATOR 96, 5th International Conference on New Actuators, Jun. 26–28, 1996, Bremen, Germany, uses as valve an elastic membrane, which is clamped between two carrier plates. The propulsion is accomplished in this case by heating and deformation. The need to manufacture several carrier parts, which must be joined together accurately positioned, is a disadvantage here also. The heating of the membrane represents a limitation for certain reagents. The amount delivered can also be controlled only with difficulty.

An arrangement, described in Temmel et al., A Micromechanical System for Liquid Dosage and Nebulization, ACTUATOR 96, 5th International Conference on New Actuators, Jun. 26–28, 1996, Bremen, Germany, also uses several individual parts which must be joined together positionally accurate with respect to one another. The system is driven by electrostatic forces which deform a membrane. The valves are constructed as gates which produce a direction-dependent flow resistance. The amount delivered is controlled. The expensive manufacturing process, especially when an arrangement with several dozen pumps is being considered, is also a disadvantage.

SUMMARY OF THE INVENTION

It is, therefore, an object of the invention to provide an apparatus for analyzing liquid samples automatically and continuously, which is defined by a large number of pumps, valves, mixing and reaction chambers in the same shaped part, which can be produced with high precision.

This objective is accomplished owing to the fact that a structure is provided in a silicon wafer of 100 orientation by anisotropic etching which, together with a glass covering layer mounted by anodic bonding, results in an arrangement of pumps, valves, mixing chambers and reactors. As a driving mechanism, the pumps use a piezo dimorphic system which is formed by mounting a piezo plate or a piezo-active layer on the glass covering layer or on the bottom of the pump chamber.

The pump chamber is rectangular with a trapezoidal cross section. Directly in front of and behind the pump chamber there are conduits of a triangular or trapezoidal cross section which present a nonlinear flow resistance. The mode of functioning is that, up to a certain flow velocity v, laminar flow exists and, when this flow velocity is exceeded, this laminar flow changes over into turbulent flow. With that, there is a sudden change in the flow resistance.

The geometry of the inlet and outlet ducts is different, so that the point at which linear and nonlinear flow sets in is different. If now the membrane is deflected with a steady pulse, the amplitude of which changes with the duration, the times at which there is a changeover from laminar to turbulent flow are different in the inlet and outlet ducts. With that, a direction-dependent flow resistance results over average time and brings about a volume flow over the whole of the arrangement. The volume flows in the one direction or the other, depending on whether the pulse is increasing or decreasing over time. For metering precisely the amount of liquid delivered, measurement conduits, adjoining the pump chamber and representing a defined flow resistance, can be accommodated in the silicon wafer. Liquid pressures, arising at the two ends of the measurement conduit, are a measure of the amount flowing through the measurement duct.

The pressure difference can therefore be used as a variable for regulating the pump frequency or the pump amplitude in order to adjust the amount delivered precisely. Several pumps can act at the outlet side on a common chamber which, corresponding to the manufacturing technology for the 100 oriented silicon wafers, is also configured rectangularly with a trapezoidal cross section. Due to the asymmetric inlet into this chamber, swirling of the various reagents takes place. With that, mixing and a stable chemical reaction are produced.

The mixing chamber can be used as a common reference potential for measuring the pressure or the flow through the apparatus. The outlet side of the mixing chamber is connected by means of a conduit with the reactor, which also has a v-shaped or trapezoidal cross section. The flow rate and the conduit length can be designed so that the reaction time is sufficient for evaluating the liquid by suitable sensors. With that, quasi continuous measurement is possible.

BRIEF DESCRIPTION OF THE DRAWINGS

The concept on which the invention is based is explained in greater detail in the following description by means of an example, which is shown in greater detail in the drawings, in which

FIG. 3 shows a diagrammatic representation of micropump construction according to the invention in plan view;

FIG. 4 shows a diagrammatic representation of micropump construction according to the invention in cross sectional view;

FIG. 6 shows a plot of the volume flows over a time period;

FIG. 9b shows a side view of FIG. 9a; and

DETAILED DESCRIPTION OF THE INVENTION

Figure 1:
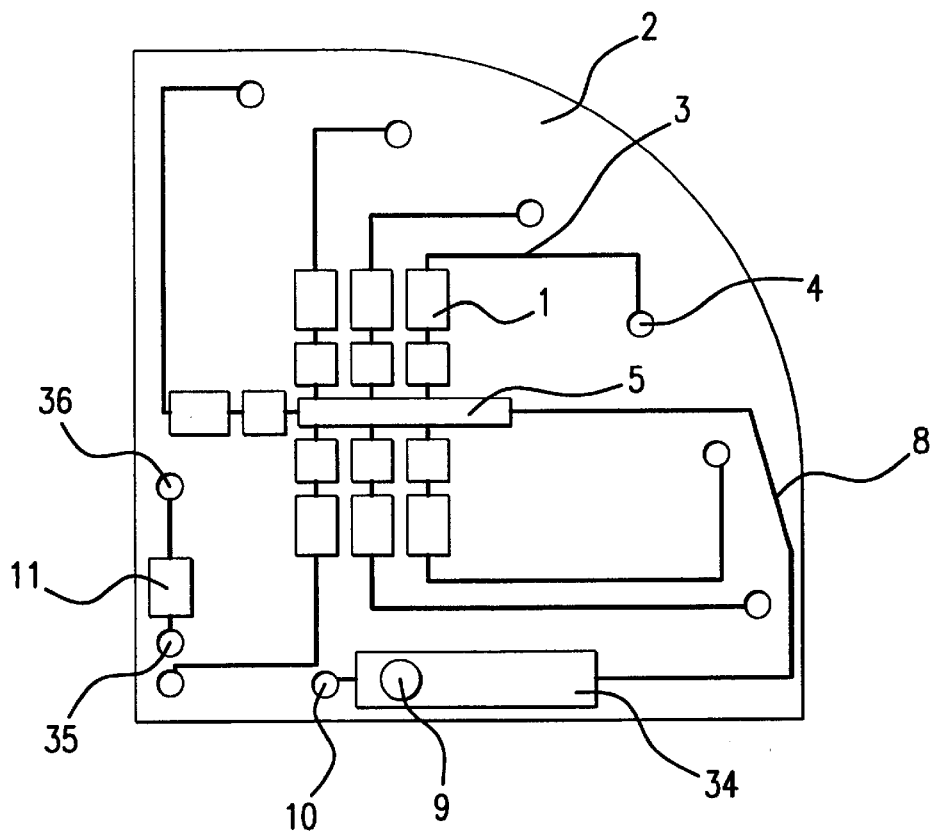
FIG. 1 shows an overall view of an analytical system according to the invention.

FIG. 1 shows the structural principle of the arrangement. There are several micropumps on an approximately 500 $\mu$m thick silicon wafer 2 with a 100 crystalline orientation. The micropumps 1 are connected by means of conduits 3 with inlet openings 4 through which the sample liquids or reagents are supplied. In this connection, the micropumps 1 act on a mixing chamber 5, in which swirling of the reagents that have been introduced takes place. Each micropump 1 occupies an area of about 10 $mm^2$. Due to the properties of the 100 oriented silicon, the connecting conduits are constructed with a triangular cross section, a structural depth of about 100 $\mu$m and are rectangular at the bends.

Figure 7:
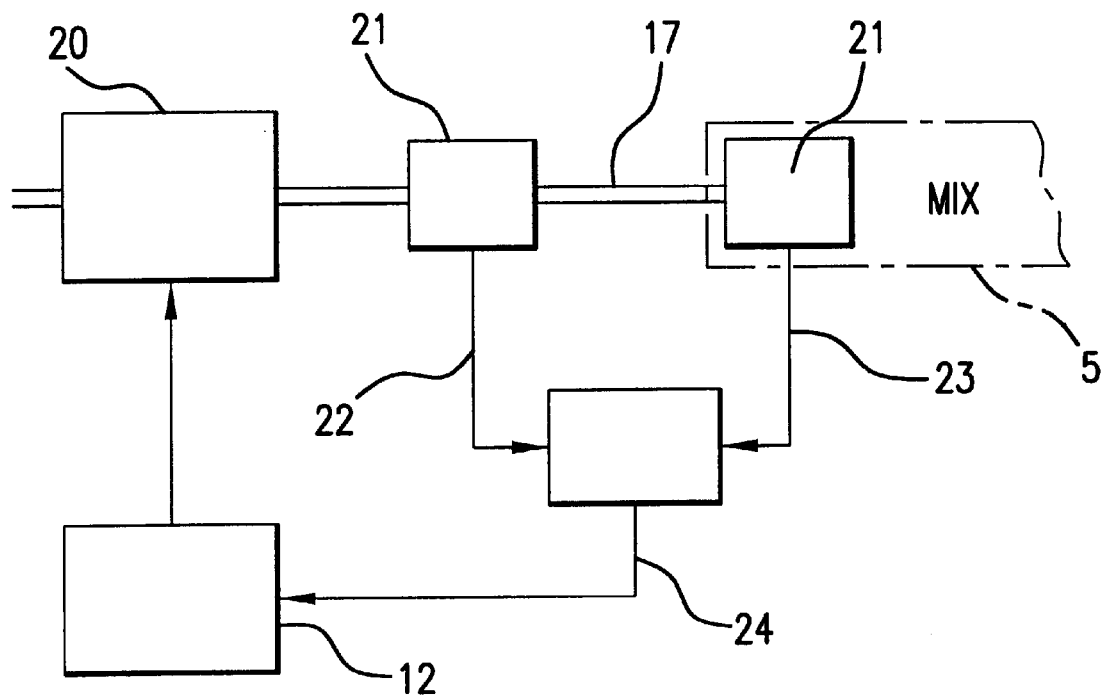
FIG. 7 shows the control system for amounts metered.
Figure 8:
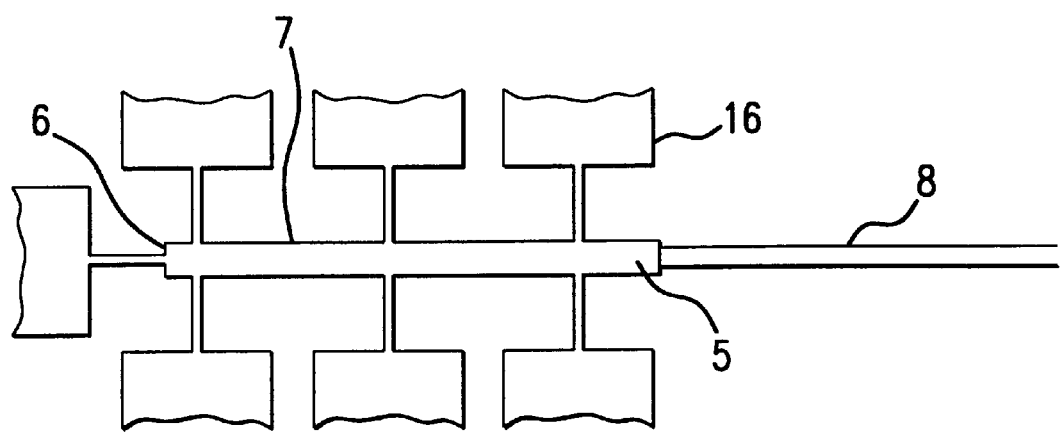
FIG. 8 shows a diagrammatic representation of the mixing chamber.

Referring to FIGS. 7 and 8, an inlet, of a measurement conduit 17 into the also rectangular mixing chamber 5 with a trapezoidal cross section, advisably is constructed so that the liquid sample is introduced at a transverse side 6 and the reagents, which are to be added, are introduced in proportionally smaller amounts at two longitudinal sides 7 of the mixing chamber 5. From the mixing chamber 5, the mixed product is supplied via a relatively long reaction conduit 8 to the evaluating sensors 9 for evaluating defined liquid properties as shown in FIG. 1. The evaluating sensors 9 are located directly on the silicon wafer 2 or, in a different example, outside of the silicon wafer 2, adjoining the outlet 10. The length of the reaction conduit 8 is determined by a required reaction time for the mixed product in conjunction with a velocity of the volume flow before evaluation with the evaluating sensor 9. Further micropumps 11 can be disposed on the silicon wafer 2 with a separate inlet 35 and outlet 36 in order to supply systems located, for example, in a periphery of the arrangement, with liquid.

Figure 2:
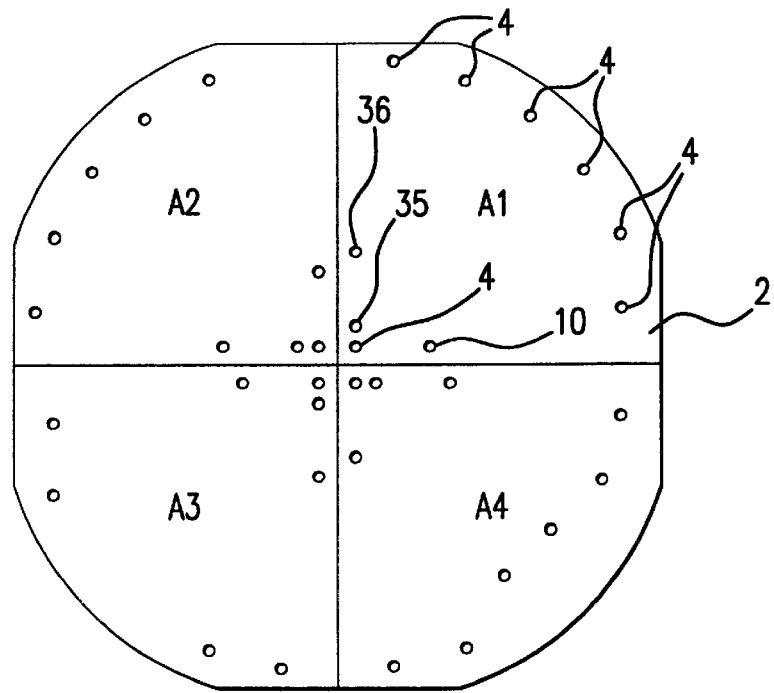
FIG. 2 shows an analytical system for several analyses according to the invention.

Referring to FIG. 2, when a silicone wafer with a 4 inch diameter is used, a plurality of the micropumps 1, mixing chambers 5 and evaluating sensors 9 can be disposed and used for different types of analytical procedures. In the exemplary embodiment of FIG. 2, four methods or analytical procedures A1 to A4 are realized with a single silicon wafer 2. Each method takes up a quarter of the available area. The structure of the analytical system, as shown in FIG. 1, is realizable universally and redundantly without a significant cost disadvantage. The micropumps 1 which are not required are blocked at the respective inlet opening 4.

Referring to FIGS. 3 and 4, the construction of a single micropump 1 is shown in plan view and cross section respectively. A pump chamber 13 is rectangular and an inlet conduit 14 and outlet conduit 15 have differing cross sections. The outlet conduit 15 leads into a further pressure measuring chamber 16 which is used to measure the pressure. The measuring conduit 17 connects the pressure measuring chamber 16 with the mixing chamber 5. The sectional representation of FIG. 4 illustrates the construction of the pump system. All chambers 13, 5, as well as the connecting conduits 3, 8, 17, are produced by deep etching which is carried out anisotropically. The arrangement as a whole is covered by an approximately 150° Jim thick glass covering layer 18, which is connected tightly by an anodic bonding with the silicon wafer 2. There are electrical strip conductors 19 on the glass covering layer 18 for contacting the piezo elements 20. The piezo elements 20, which are glued onto the glass covering layer 18, together with the glass covering layer 18 form a dimorphic system which warps when an electrical voltage is applied and, with that, brings about a flow of volume in the pump chamber 13. Pressure sensors 21 are mounted on the glass covering layer 18 over the measuring chambers 16. The pressure sensors 21 measure the warping which occurs as a function of the pressure in the pressure measuring chamber 16 and convert it into an electrically measurable signal. Advantageously, the pressure sensors 21 are constructed in piezo resistive layers.

Figure 5:
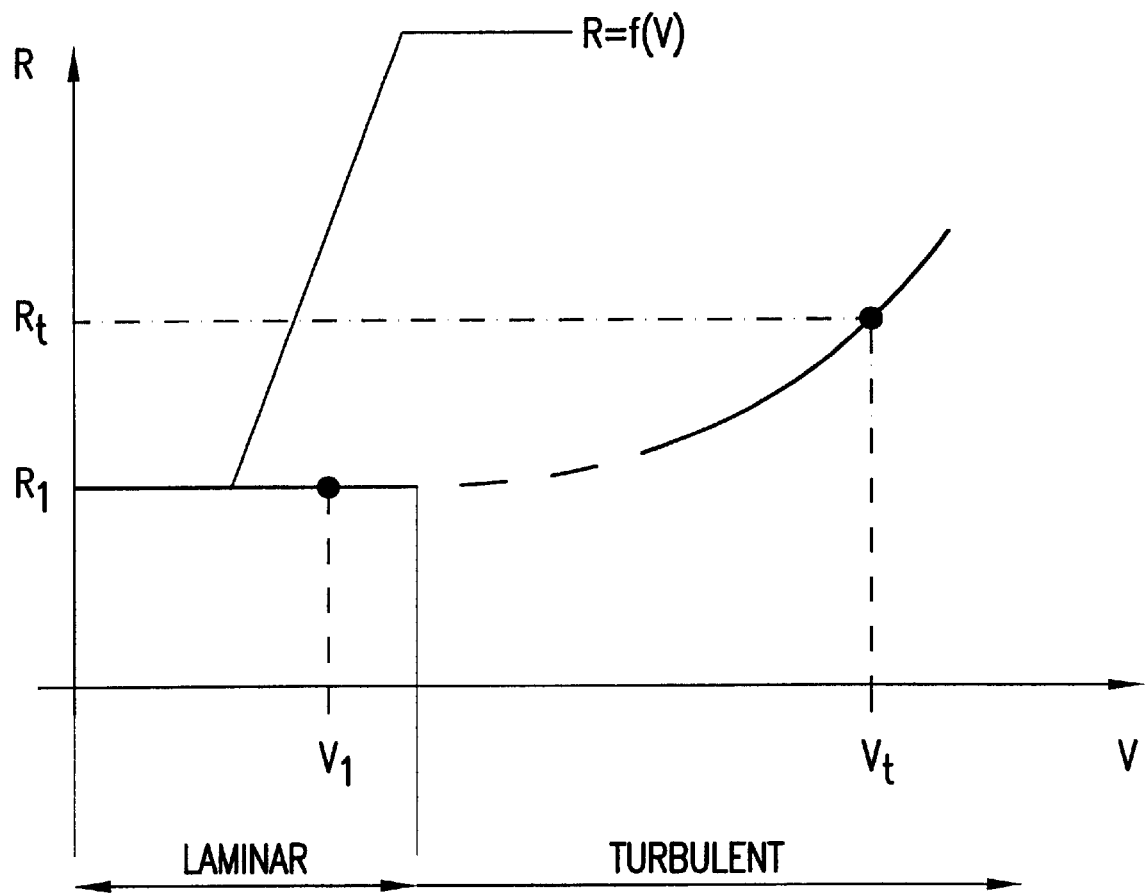
FIG. 5 shows a plot of flow resistances versus volume flows.

The inlet conduit 14 and outlet conduit 15 act as resistances to the volume flowing. The special feature of the flow resistances in the microregion is that at a certain flow velocity laminar flow changes over into a turbulent flow. The flow resistance increases suddenly, as shown in FIG. 5, from a value $R_l$ to a value $R_t$. Due to the different geometries of the inlet conduit 14 and the outlet conduit 15, the transition from $R_l$ to $R_t$ takes place at different flow velocities. If now the piezo element 20 is triggered with a relatively steep flank, there is a rapid volume change in the pump chamber 13 and this volume change leads to a liquid stream of high velocity. In the inlet conduit 14 with a smaller cross section, this liquid flow leads to a sudden increase in resistance, whereas the flow resistance in the outlet conduit 15 remains largely constant. The fluid flow produced in the pump chamber 13 is divided differently depending on the flow resistances. In the embodiment of FIG. 3, the bulk of the fluid flows through the outlet conduit 15. The dimorphic system formed from the piezo element 20 and the glass covering layer 18 is reset with a relatively flat pulse flank. The volume change in the pump chamber 13 is correspondingly slow. It is avoided that the flow in the inlet conduit 14 becomes turbulent, so that the flow resistance here remains almost constant. Thus, the division of the volume flowing is different than in the case of the rapid volume change of the pump chamber 13, although here also the greater part of the volume flows through the outlet conduit 15, however, with the reverse algebraic sign.

Referring to FIG. 6, graphs of the chamber volume, inlet volume flow $°V_a$ and outlet volume flow $°V_b$ over time illustrate that the fluid flows predominantly in one direction over the whole length of a saw tooth-shaped triggering pulse; this is equivalent to a pumping action. During a time period $T_{lowering}$, the time during which the chamber volume is decreased rapidly resulting in a steep negative slope in the chamber volume graph, a significantly greater amount of the outlet volume flow $°V_b$ exists than inlet volume flow $°V_a$ due to the existence of the turbulent flow in the inlet conduit 14 as oppose to the laminar flow in the outlet conduit 15. During a time period $T_{lifting}$, the time period during which the chamber volume is increasing at a slower rate than the decrease of the volume chamber, only a slightly greater amount of the outlet volume flow $°V_b$ exists than inlet volume flow $°V_a$ due to the existence of laminar flow in both the inlet conduit 14 and the outlet conduit 15. Thus, the net effect over a complete pump cycle, $T_{lowering}$ and $T_{lifting}$, is that fluid flows from the inlet conduit 14, through the pump chamber 13, and out the outlet conduit 15.

The measurement conduit 17 is dimensioned so that there is no transition to turbulent flow in any case. With that, depending on the volume flowing, there is a pressure difference, which at the same time is a measure of the amount flowing through the conduit. The specially constructed pressure measuring chamber 16 records the warping of the glass covering layer 18. The mixing chamber 5, which follows the measuring conduit 17, also has pressure sensors 21 on the glass covering 18, which record the warping, so that two pressure signals 22 and 23, depicted in FIG. 7, represent the pressure difference.

As shown in FIG. 7, the two pressure signals 22 and 23 are compared with one another. The resulting difference signal 24 is converted into a signal which is supplied to a servo component 12 for the output of the micropump 1. For this purpose, the difference signal 24 produces a change in the voltage amplitude or in the frequency of the signal applied to the piezo element 20. In this way, a regulating circuit is formed which permits the reagents for the analytical process to be metered accurately even under changing environmental conditions.

FIG. 8 shows an example of the construction of a mixing chamber 5 in which six different reagents can be added to the sample.

Figure 9A:
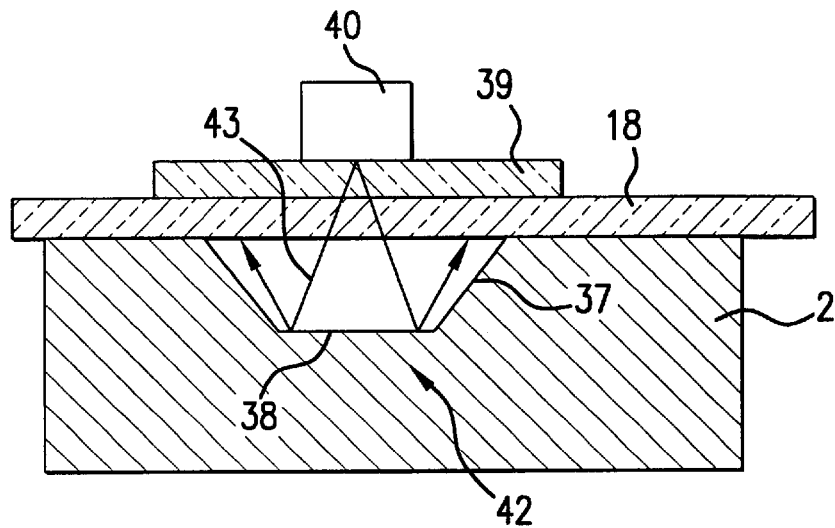
FIG. 9a shows a cross section of a silicon wafer with glass covering according to the invention in conjunction with means for effecting an optical evaluation of the reaction product.
Figure 9B:
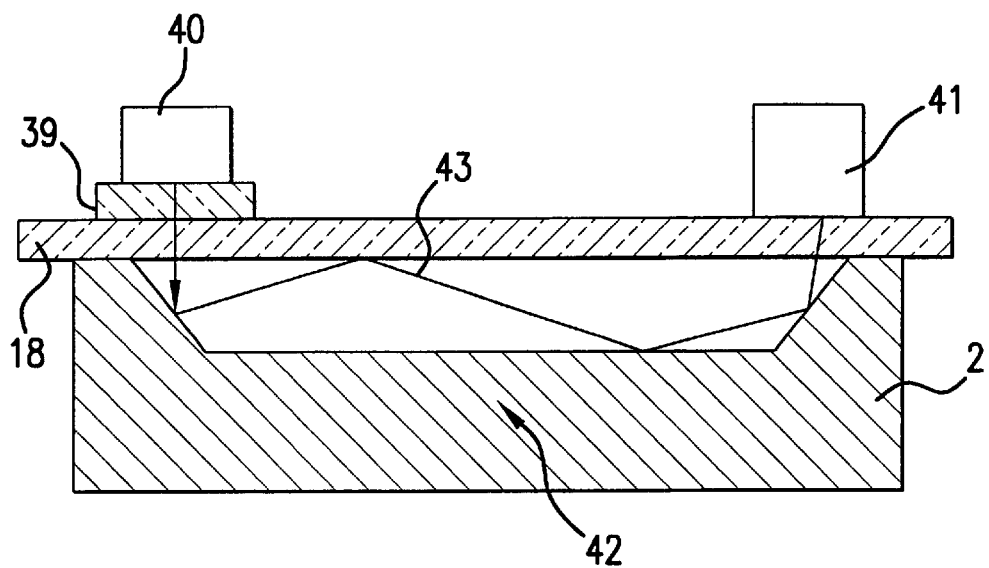

It is advantageous for the evaluation of optical properties to integrate also the cuvettes, necessary for this, in the silicon wafer 2. FIGS. 9a and 9b show an example, for which light from a light-emitting diode 40 is coupled into and out of a cuvette conduit 42 for the purpose of determining the extinction of light effected by the reaction product, i.e., the attenuation of the light beam in the cuvette channel. The reflection at the inclined chamber walls 37, at the chamber bottom 38 and at the glass covering layer 18 is used for this purpose. Spectral selectivity can be achieved by inserting spectral filters 39, such as interference filters, into the beam path. The light is measured by a photo element 41 which preferably is constructed as a phototransistor.

Figure 10:
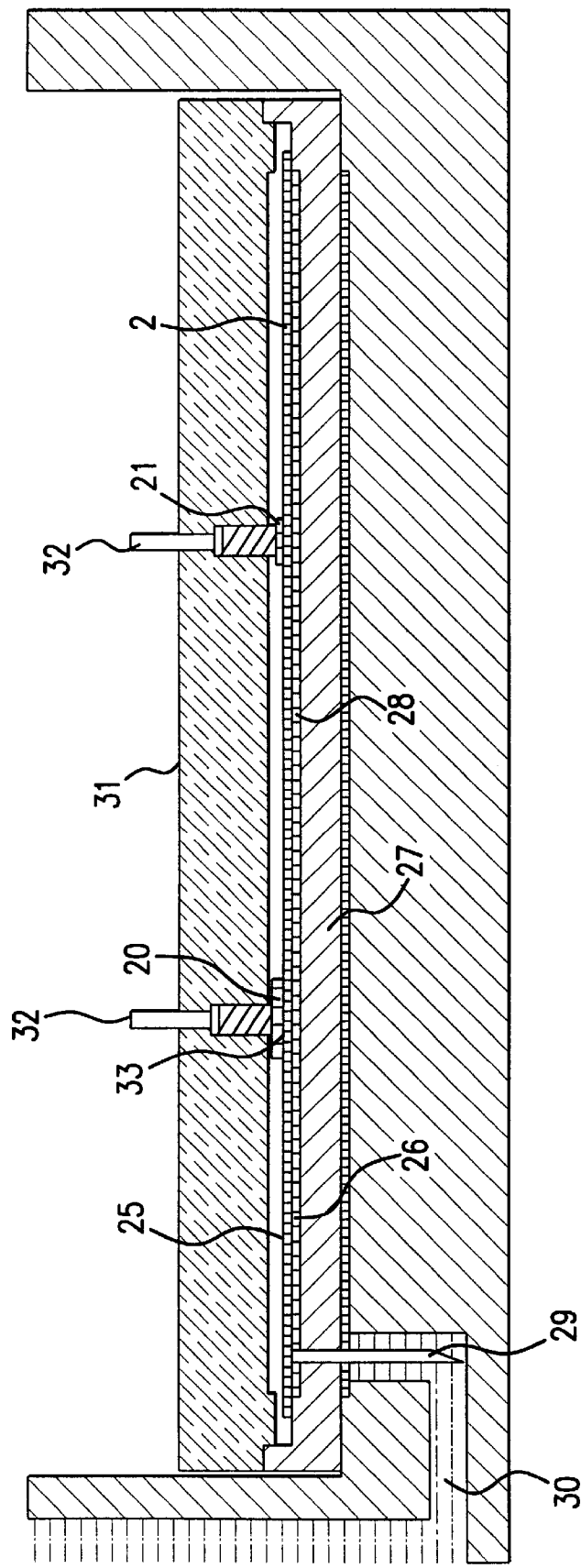
FIG. 10 is a cross section of an analytical system according to the invention including means for supplying the liquids.

Referring to FIG. 10, for the overall arrangement of the analytical system, it is advisable to use the upper side 25 of the silicon wafer 2 for contacting the electrical signals and the underside 26 of the wafer for supplying the sample or the reagent. The wafer 2 is mounted for this purpose on a chip carrier 27, for example, by gluing 28. The chip carrier 27 receives hollow needles 29, which are inserted mechanically rigidly and connected with appropriate reservoirs 30. At a short distance above the upper side of the silicon wafer 2 there is a carrier plate 31 for the electrical contacts 32, which act elastically on the contact surfaces 33 of the piezo elements 20 or on the pressure sensors 21. In this way, the sensitive silicon wafer 2 is protected. The overall arrangement thus permits the system to be operated under harsh conditions.

The invention is described and presented above by means of selected distinguishing features. Of course, the invention is not limited to this representation. Rather, all distinguishing features can be used alone or in any combination, even independently of their combination in the claims.

What is claimed is:

1. An apparatus for mixing liquid reagents thereby to cause a reaction in which the reagents react chemically and for analyzing, by means of a sensor, a sample of liquid resulting from the reaction, comprising:

a substrate having a micropump including an inlet conduit and an outlet conduit etched in the substrate and a pumping chamber etched in the substrate and connected to the inlet conduit and the outlet conduit, the pumping chamber having a volume which expands and contracts during a complete pump cycle;

said substrate having a mixing chamber etched thereon and connected to said outlet conduit;

said inlet conduit having an effective flow cross section different from that of said outlet conduit such that over the complete pump cycle net fluid flow is from the inlet conduit and out the outlet conduit; and a covering layer covering said substrate to seal said pumping chamber, said inlet conduit, said outlet conduit and said mixing chamber;

wherein said pumping chamber contracts and expands such that a flow in the inlet conduit is laminar entering said pumping chamber and turbulent exiting said pumping chamber and a flow in the outlet conduit is laminar both entering and exiting said pumping chamber.

2. The apparatus of claim 1, wherein the micropump includes said pumping chamber being rectangular with a trapezoidal cross section covered by said covering layer, a piezo element on said covering layer for changing a volume of said pumping chamber, and said inlet conduit and said outlet conduit have different flow resistances.

3. The apparatus of claim 2, further comprising a pressure measuring chamber connected via the outlet conduit with the micropump and via a measuring conduit with the mixing chamber, and a first pressure sensor coupled with said measuring chamber and a second pressure sensor coupled with said mixing chamber each supplying signals for determining a difference signal for a servo component of the micropump.

4. The apparatus of claim 1 or 2, wherein multiple ones of said micropump are connected with the mixing chamber.

5. The apparatus of claim 1 or 2, her comprising a reaction conduit disposed between the mixing chamber and an evaluating sensor.

6. The apparatus of claim 1 or 2, wherein said substrate is a silicon wafer is embedded in a chip carrier and the liquid sample and the reagents are introduced into said substrate via said chip carrier.

7. The apparatus of claim 3, wherein in a carrier plate having elastic contacts covers said covering layer and said elastic contacts make electrical connection with said piezo element and the first and second pressure sensors.

8. The apparatus of claim 1 or 2, wherein the covering layer is a glass covering layer and connected by an anodic bonding to the substrate.

9. The apparatus of claim 8, further comprising a light-emitting diode and a photoelement contacting on the glass covering layer and a cuvette duct is etched into the substrate beneath said light-emitting diode and said photoelement.

10. The apparatus of claim 1 wherein said substrate is a silicon wafer with a 100 orientation in its crystalline lattice structure and the etching of the silicon wafer is effected by anisotropic etching.

11. An apparatus for mixing liquid reagents thereby to cause the reagents to react chemically and for analyzing by means of a sensor a sample of a liquid resulting from the reaction by means of a sensor, comprising:

a substrate having a micropump with an inlet conduit and an outlet conduit etched thereon;

said substrate having a mixing chamber etched thereon and connected to said outlet conduit;

said substrate being closed off by a covering layer;

said micropump having a pumping chamber covered by said covering layer and a piezo element on said covering layer for changing a volume of said pumping chamber; and said inlet conduit having an effective flow cross section different from that of said outlet conduit such that a flow in the inlet conduit is laminar entering said pumping chamber and turbulent exiting said pumping chamber and a flow in the outlet channel is laminar both entering and exiting said pumping chamber so that over a complete pump cycle net fluid flow is from the inlet conduit and out the outlet conduit.

12. The apparatus of claim 1, further comprising a pressure measuring chamber connected via the outlet conduit with the micropump and via a measuring conduit with the mixing chamber, and a first pressure sensor coupled with said measuring chamber and a second pressure sensor coupled with said mixing chamber each supplying signals for determining a difference signal for a servo component of the micropump.

* * * * *

UNITED STATES PATENT AND TRADEMARK OFFICE
CERTIFICATE OF CORRECTION

PATENT NO.     : 6,458,325 B1
DATED          : October 1, 2002
INVENTOR(S)    : Dietrich Roscher et al.

It is certified that error appears in the above-identified patent and that said Letters Patent is hereby corrected as shown below:

<u>Title page,</u>
Item [75], insert the name of inventors as follows:
-- [75]   Inventors:     Sean Crispian KEEPING of Kent, United Kingdom;
                         Albrecht VOGEL of Stutensee, Germany;
                         Dieter BINZ of Hirschberg, Germany --.

Signed and Sealed this

Fourth Day of November, 2003

JAMES E. ROGAN
*Director of the United States Patent and Trademark Office*